United States Patent
Rasmussen

(10) Patent No.: US 12,552,481 B2
(45) Date of Patent: Feb. 17, 2026

(54) DAYLIGHT OVERRIDE FOR VEHICLE HEADLIGHT CONTROL

(71) Applicant: Harley-Davidson Motor Company, Inc., Milwaukee, WI (US)

(72) Inventor: Matthew Rasmussen, Muskego, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 40 days.

(21) Appl. No.: 18/394,914

(22) Filed: Dec. 22, 2023

(65) Prior Publication Data
US 2025/0206399 A1 Jun. 26, 2025

(51) Int. Cl.
*B62J 6/022* (2020.01)

(52) U.S. Cl.
CPC .................................... *B62J 6/022* (2020.02)

(58) Field of Classification Search
None
See application file for complete search history.

(56) References Cited

U.S. PATENT DOCUMENTS

| | | | |
|---|---|---|---|
| 6,928,180 B2 * | 8/2005 | Stam | B60Q 1/2603 382/104 |
| 10,124,716 B1 * | 11/2018 | Gauthier | B60Q 1/143 |
| 2004/0201483 A1 * | 10/2004 | Stam | G06V 20/588 340/600 |
| 2007/0276551 A1 * | 11/2007 | Brod | B60Q 1/1415 701/1 |
| 2008/0088427 A1 | 4/2008 | Martin et al. | |
| 2012/0116632 A1 | 5/2012 | Bechtel et al. | |
| 2013/0154477 A1 | 6/2013 | Wolski et al. | |
| 2016/0138934 A1 * | 5/2016 | Kim | G01C 21/3697 701/451 |

(Continued)

FOREIGN PATENT DOCUMENTS

| | | | | |
|---|---|---|---|---|
| CN | 116801449 A | * | 9/2023 | H05B 47/11 |
| DE | 4337756 A1 | | 6/1994 | |
| DE | 102004012765 A1 | | 10/2005 | |

(Continued)

OTHER PUBLICATIONS

Machine translation of CN116801449A, Sep. 22, 2023 (Year: 2023).*

(Continued)

*Primary Examiner* — Kenneth M Dunne
(74) *Attorney, Agent, or Firm* — Michael Best & Friedrich LLP

(57) ABSTRACT

Systems, methods, and devices for controlling a high beam headlight of a vehicle. One system includes a high beam headlight mounted on a vehicle, a sensor mounted on the vehicle, and an electronic control unit. The electronic control unit is configured to receive an input to turn on the high beam headlight, determine a status of an override of an automatic high beam function of the vehicle, and determine a current time of day based on data received from the sensor. In response to the current time of day being daylight and the status of the override being enabled, the electronic control unit is configured to override the automatic high beam function to allow the high beam headlight to be turned on based on the input while maintaining a status of the automatic high beam function as enabled.

20 Claims, 4 Drawing Sheets

(56) References Cited

U.S. PATENT DOCUMENTS

| | | |
|---|---|---|
| 2017/0066368 A1 | 3/2017 | Miller |
| 2021/0178960 A1* | 6/2021 | Fenske .................. G01S 17/931 |

FOREIGN PATENT DOCUMENTS

| | | | |
|---|---|---|---|
| GB | 2295891 A | 6/1996 | |
| JP | 2022164300 A | 10/2022 | |
| WO | WO-2023091421 A1 * | 5/2023 | ............... G09G 3/30 |

OTHER PUBLICATIONS

European Patent Office Extended Search Report for Application No. 24218643.5 dated Apr. 14, 2025 (11 pages).

Japanese Patent Office Action for Application No. 2024225039 dated Oct. 21, 2025 (18 pages including English machine translation).

* cited by examiner

DAYLIGHT OVERRIDE FOR VEHICLE HEADLIGHT CONTROL

FIELD

Aspects described herein relate to systems and methods of controlling a lighting system on a vehicle, such as a motorcycle high beam system.

SUMMARY

Vehicles are equipped with one or more headlights, such as, for example, one or more low beam headlights and one or more high beam headlights. The headlights can be controlled in response to user input (e.g., operation of an actuator or other input mechanism, such as, for example, a button, a lever, a switch, or the like). Some vehicles are also equipped automatic headlight control where an electronic control unit included in the vehicle is configured to control operation of a headlight in response to data collected via one or more sensors, such as one or more vehicle sensors. For example, vehicles can be equipped with an automatic high beam (AHB) control or function configured to automatically (i.e., without user interaction) turn off a high beam headlight in response to detecting one or more driving conditions, such as driving conditions where high beams may be ineffective or may impact other vehicles.

Aspects described herein provide, for example, systems and methods for overriding automatic headlight control, such as, for example, an AHB function, for a particular driving condition without requiring that the control be disabled. For example, one aspect provides a system comprising a high beam headlight mounted on a vehicle, a sensor mounted on the vehicle, and an electronic control unit. The electronic control unit is configured to receive an input to turn on the high beam headlight, determine a status of an override of an automatic high beam function of the vehicle, and determine a current time of day based on data received from the sensor. In response to the current time of day being daylight and the status of the override being enabled, the electronic control unit is configured to override the automatic high beam function to allow the high beam headlight to be turned on based on the input while maintaining a status of the automatic high beam function as enabled.

Another provides a method for controlling a high beam headlight of a vehicle. The method comprises receiving, at an electronic control unit of the vehicle, an input to turn on the high beam headlight, determining, at the electronic control unit, a status of an override of an automatic high beam function of the vehicle, and determining, at the electronic control unit, a current time of day. The method also comprises, in response to the current time of day being daylight and the status of the override being enabled, overriding, at the electronic control unit, the automatic high beam function to allow the high beam headlight to be turned on based on the input while maintaining a status of the automatic high beam function as enabled.

Yet another aspect provides non-transitory computer-readable medium storing instructions that, when executed by one or more electronic processors, perform a set of functions. The set of functions comprising receiving an input to turn on a high beam headlight of a vehicle, determining a status of an override of an automatic high beam function of the vehicle, and determining a current time of day. The set of functions further comprises, in response to the current time of day being daylight and the status of the override being enabled, overriding the automatic high beam function to allow the high beam headlight to be turned on based on the input while maintaining a status of the automatic high beam function as enabled.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various aspects and explain various principles and advantages of those aspects.

DETAILED DESCRIPTION

Figure 1:
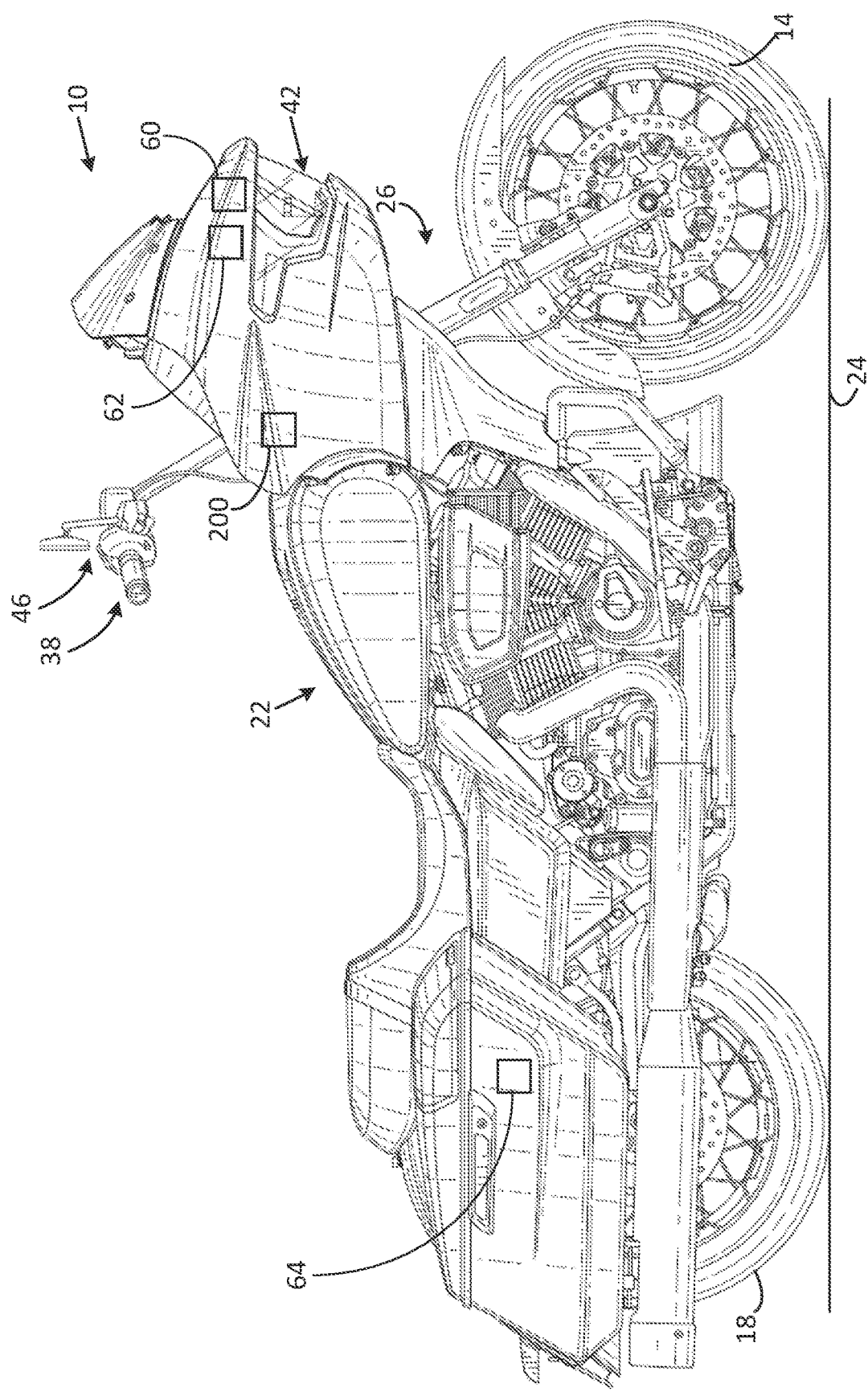
FIG. 1 is side view of a motorcycle according to some aspects.

One or more aspects are described and illustrated in the following description and accompanying drawings. These aspects are not limited to the specific details provided herein and may be modified in various ways. Furthermore, other aspects may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some examples described herein may include one or more electronic control units or controllers. It will be appreciated that these electronic control units or controllers may be comprised of one or more generic or specialized electronic processors, such as, for example, microprocessors, digital signal processors, customized processors, and field programmable gate arrays (FPGAs) and unique stored program instructions (including both software and firmware) that control the one or more electronic control units or controllers to implement the functionality described herein.

Similarly, aspects described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. Moreover, relational terms such as first and second, top and bottom, and the like may be used herein solely to distinguish one entity or action from another entity or action without necessarily requiring or implying any actual such relationship or order between such entities or actions.

As described above, aspects described herein provide systems and methods for controlling a headlight assembly of a vehicle, such as, for example, a high beam headlight of a motorcycle. While aspects are described herein with respect to a motorcycle, the components and associated functionality described herein are not limited to motorcycles but can be used in any type of vehicle (for example, a moped, an electric bicycle, a three-wheeled vehicle, a passenger vehicle, a semi-truck, and the like).

FIG. 1 is a side view of a motorcycle 10 according to some aspects. The motorcycle 10 includes a front wheel 14, a rear wheel 18, and a main frame 22. The front and rear wheels 14, 18 engage a surface 24, which may be, for example, pavement, gravel, or the like. The main frame 22 includes or is coupled to a front fork 26 supporting the front wheel 14 and a rear swingarm supporting the rear wheel 18. The motorcycle 10 illustrated in FIG. 1 may be powered via an internal combustion engine. However, aspects described herein are not limited to motorcycles with an engine and the systems and methods described herein may be used with electric motorcycles, hybrid motorcycles, or vehicles powered via other motive sources or combinations thereof.

The front fork 26 is configured to rotate to change the orientation of the front wheel 14 with respect to the rear wheel 18. Rotation of the front fork 26 is controlled via a pair of handlebars 38. The pair of handlebars 38 provide an area for a user to grasp and rotate the front fork 26 to a desired orientation. The handlebars 38 further include one or more input mechanisms (e.g., actuators, touchscreens, microphones, etc.) that enable the user to operate various components and systems of the motorcycle 10, such as a high beam headlight 42 mounted on the vehicle, which may be included as part of a headlight assembly also including a low beam headlight, one or more turn signals, a fog light, a running light, or a combination thereof.

For example, as illustrated in FIG. 1, one or both handlebars 38 may include a lighting control or input mechanism 46, which may be a button, a knob, a momentary switch, a lever, a joystick, a touch screen, a microphone (e.g., for voice activation), or the like. As described in more detail with respect to FIG. 2, input received via the lighting input mechanism 46 is provided to an electronic control unit (ECU) 200 of the motorcycle 10 configured to control the high beam headlight 42. Controlling the high beam headlight 42 may include turning on or turning off the high beam headlight 42. In some aspects, the ECU 200 is similarly configured to use received user input (e.g., through the lighting input mechanism 46 or other input mechanisms) to control other lights, such as, for example, a low beam headlight. In other aspects, the motorcycle 10 may include a separate ECU configured to control other lights on the motorcycle 10.

Although not illustrated in FIG. 1, the motorcycle 10 also includes one or more user interfaces for providing information to a user. The user interfaces may be mounted on the motorcycle 10 and may include one or more liquid crystal displays (LCDs), lights or indicators, light emitting diodes (LEDs), touchscreens, or heads-up displays, speakers, vibration devices, or the like and may provide information to a user regarding, for example, current operating conditions of the motorcycle 10 (e.g., a speed, a direction of travel, milage, etc., a state of various vehicle components (e.g., whether the high beam headlight 42, or a combination thereof). The user interfaces may provide information to a user in a visual form, an audible form, a tactile form, or a combination thereof. For example, a user interface may include a speaker configured to provide audio output, a vibration device configured to provide tactile output, or a combination thereof.

One or more of the provided user interfaces may also operate as an input mechanism for receiving user input. For example, when a user interface includes a touchscreen, the user interface may present one or more graphical user interfaces including one or more selections mechanisms that a user can select (e.g., touch, drag, drop, etc.) to provide input. Similarly, in some aspects, the motorcycle 10 may be equipped with a microphone, a camera, or other sensors for receiving audible, visual, or tactile input from a user. Thus, references herein to an "input mechanism" include a physical device or actuator manipulatable by a user, a touchscreen, a microphone, a camera, or other device positioned anywhere on the motorcycle 10 and configured to receive input from a user. In fact, in some aspects, an "input mechanism" as used herein includes a portable device, such as, for example, a mobile phone, a tablet computer, a smart watch or other wearable, a key fob, or the like configured to communicate with a communication interface of the motorcycle 10 to receive user input (e.g., configuration settings or inputs).

The motorcycle 10 also includes one or more sensors. For example, as illustrated in FIG. 1, the motorcycle 10 may include a forward-facing camera 60 (e.g., mounted on a front fairing of the motorcycle 10) configured to collect image data of the environment surrounding the motorcycle 10, a light sensor 62 configured to measure an amount of light (e.g., an ambient light level) of the environment surrounding the motorcycle 10 (e.g., mounted on a front fairing or other upward facing surface of the motorcycle 10), or a combination thereof. The camera 60 may include a custom imager camera for automotive vision applications and may be configured to detect daylight operating conditions of a vehicle, such as based on luminance values. In some aspects, the light sensor 62 is positioned to face upward (e.g., toward the sky or opposite the surface 24). As illustrated in FIG. 1, the motorcycle 10 may also include a speed sensor 64 (e.g., a wheel speed or rotation sensor) configured to measure a speed of the motorcycle 10. The speed sensor 64 may include one or more optical or magnetic sensors, such as, for example one or more Hall Effect sensors. The locations of the camera 60, the light sensor 62, and the speed sensor 64 illustrated in FIG. 1 are provided as examples and various locations on the motorcycle 10 are possible. For example, in some aspects, speed sensor 64 measures a speed of the back wheel 18 or a speed of the front wheel 14. Also, in some aspects, the motorcycle 10 only includes the camera 60 or the light sensors 62 but not both. For example, in some aspects, image data collected via the camera 60 may be used to measure light without the need for the separate light sensor 62. Also, in some aspects, data described herein as being provided via the camera 60, the light sensor 62, or both may be obtained by the ECU 200 from other sources, such as, for example, a user's mobile phone, smart watch or other wearable, other motorcycles, or other devices communicating with the motorcycle 10 via one or more communication interfaces.

Figure 3:
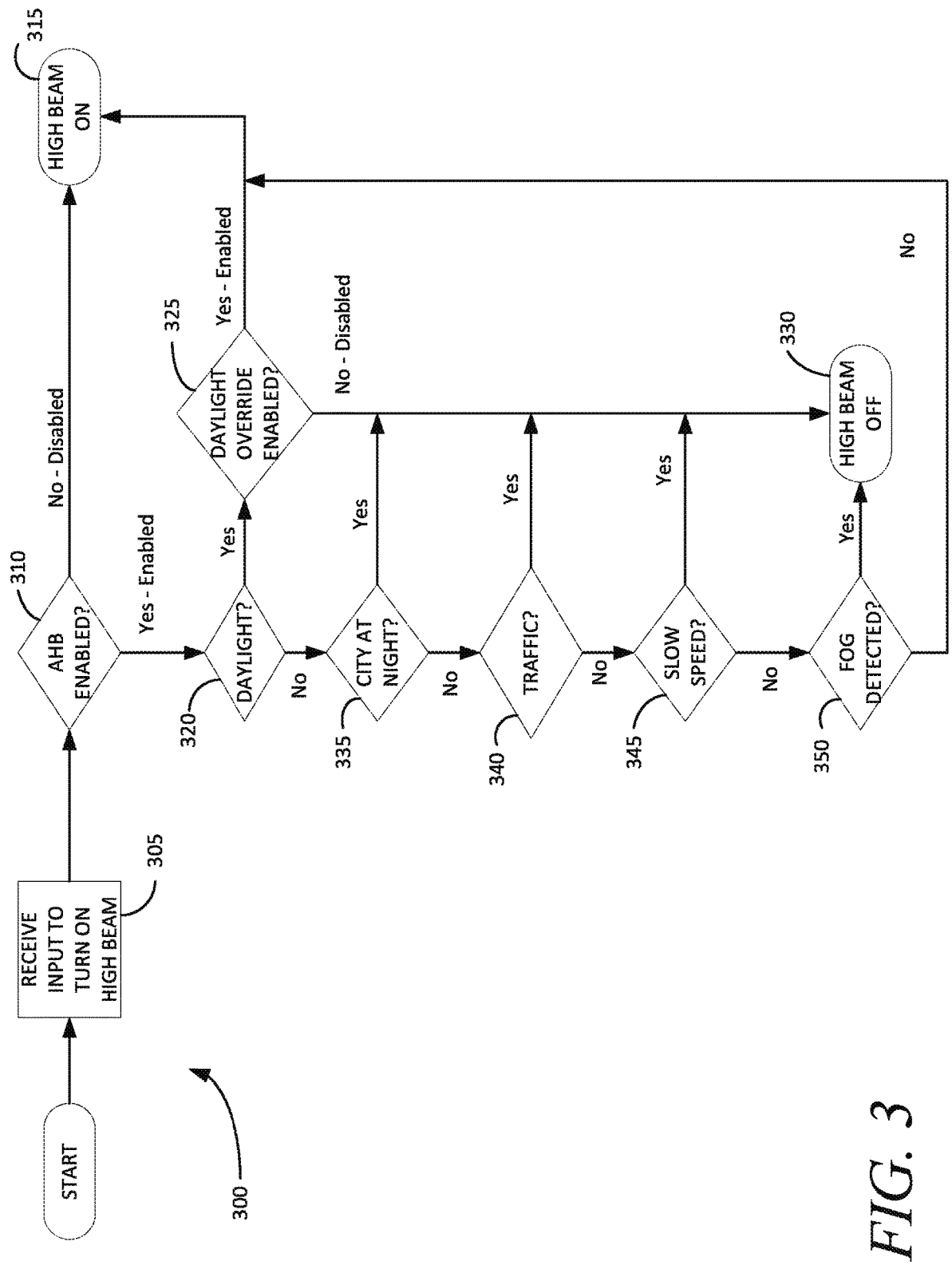
FIG. 3 is a flowchart illustrating a method of controlling a high beam headlight of the motorcycle of FIG. 1 according to some aspects.
Figure 4:
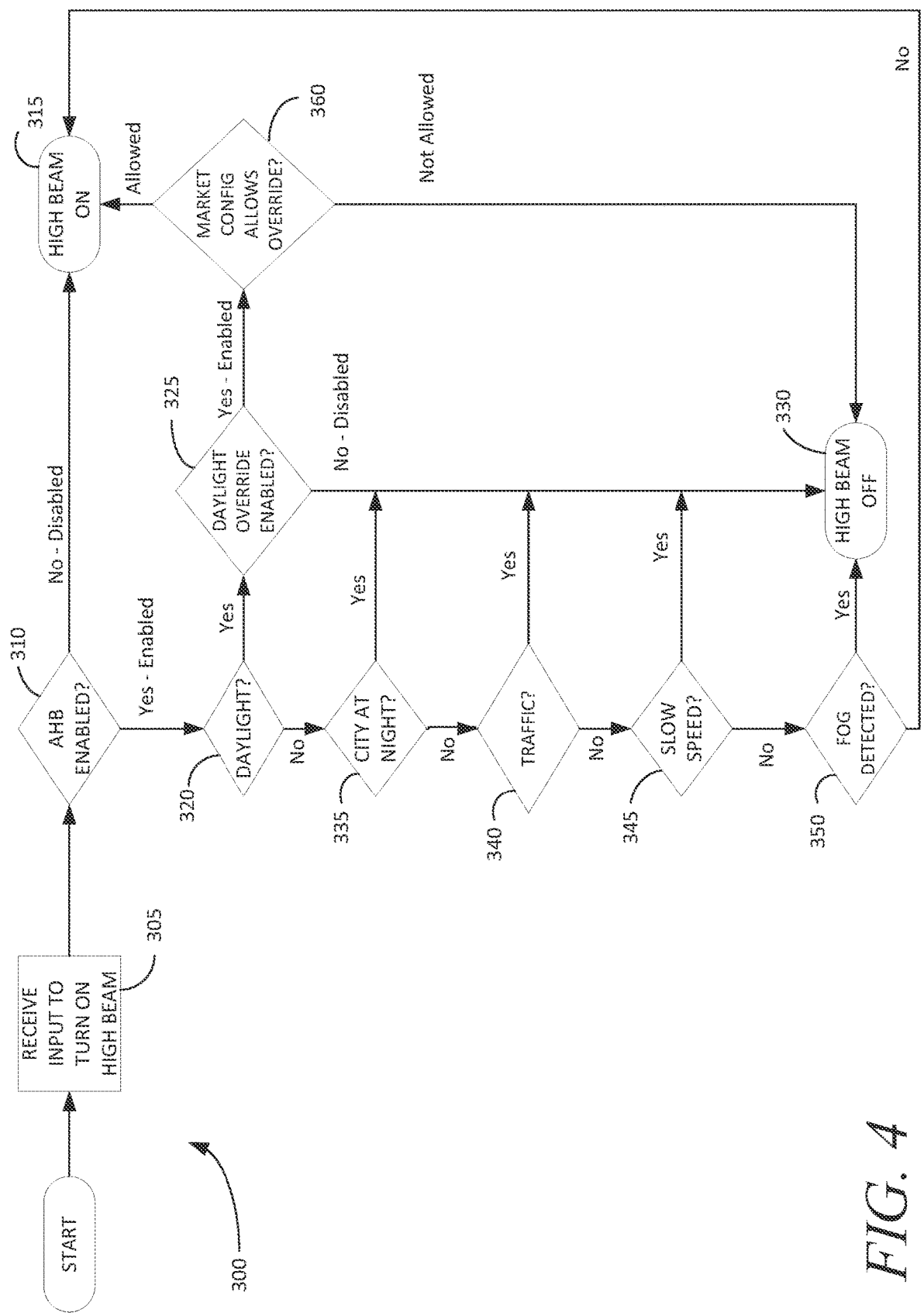
FIG. 4 is a flowchart illustrating another method of controlling a high beam headlight of the motorcycle of FIG. 1 according to other aspects.

As described in more detail with respect to FIGS. 3 and 4, data from the sensors (e.g., the camera 60, the light sensor 62, the speed sensor 64, or a combination thereof) may be used by the ECU 200 as part of controlling the high beam headlight 42. For example, the ECU 200 may be configured to provide an automatic high beam (AHB) function. As noted above, an ABH function automatically turns off a high beam headlight in response to detecting various driving conditions. These driving conditions may include, for example, driving during the daylight, driving in a city or other populated area (where other lighting, such as street lights, is likely present and oncoming and preceding traffic is also likely), driving when oncoming and/or preceding traffic is detected, driving below a predetermined speed threshold (e.g., 15-25 kilometers per hour), and driving in fog. Accordingly, the ECU 200 may use data from the light sensor 62, the camera 60, or both to detect whether the motorcycle 10 is being driven during the daylight, may use data from the camera 60 to detect whether the motorcycle 10 is being driven in the city or another populated area (e.g., by detecting street lights, signs, buildings, or the like in image data), may use data from the camera 60 to detect whether the motorcycle 10 is being driven in a fog, or may use data from the speed sensor 64 to determine whether the vehicle is traveling below a predetermined speed threshold. As noted above, in some aspects, the ECU 200 may obtain data for performing AHB control from other sources or vehicle components or even from an external device communicating with the motorcycle 10. For example, the ECU 200 may use time and date information maintained by a clock of the motorcycle 10 or an external device to determine whether the motorcycle 10 is driving during the daylight, may use objects detected by a cruise control system or driver assistance system of the motorcycle 10 to determine whether there is oncoming and/or preceding traffic, or may use navigation data maintained by navigation system of the motorcycle 10 or an external device to determine whether the motorcycle 10 is being driven in a populated area, may use weather information maintained by an infotainment system of the motorcycle 10 or an external device to determine whether the motorcycle is being driven in fog. Accordingly, the use of the sensors described herein for performing AHB control is provided as one example configuration for detecting driving conditions.

When a vehicle is equipped with an AHB function, input received from a user to turn on a high beam headlight may be overridden (e.g., ignored) by the AHB function. For example, in response to receiving input (e.g., via the lighting input mechanism 46) to turn on the high beam headlight 42 during a daylight driving condition while the AHB function is enabled, the AHB function implemented via the ECU 200 prevents the high beam headlight 42 from being turned on. Accordingly, to turn on the high beam headlight 42 in such a situation (which may be common for some types of vehicles, such as, for example, motorcycles), the AHB function must be enabled. Disabling the AHB function, however, prevents the AHB function from operating, which means that if the vehicle eventually is operated in a nighttime driving condition and oncoming and/or preceding traffic is detected, no automatic high beam control is provided (although the user may be relying on such automatic control being performed) and the high beam headlight 42 may impact other vehicles.

Accordingly, to address these and other issues, the ECU 200 is configured to provide a daylight override that, when enabled, allows the high beam headlight 42 to be turned on during a daylight driving condition even when the AHB function is enabled and without requiring the AHB function be disabled. Additional details regarding the override are provided with respect to FIGS. 3 and 4.

Figure 2:
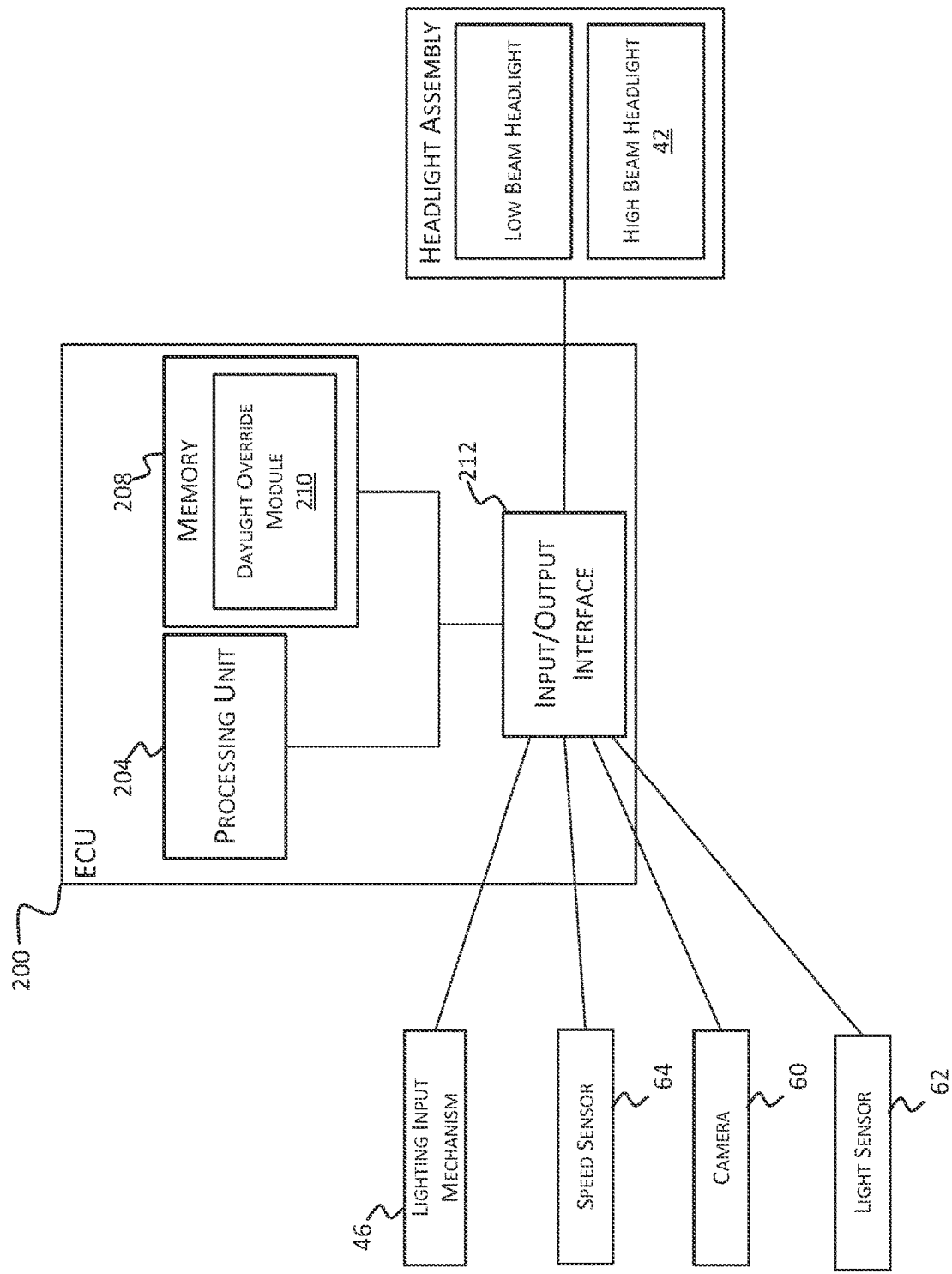
FIG. 2 schematically illustrates an electronic control unit of the motorcycle of FIG. 1 according to some aspects.

FIG. 2 schematically illustrates the ECU 200 of the motorcycle 10 according to some aspects. The ECU 200 may include additional components than those illustrated in FIG. 2 and may include components in various configurations. The particular set and configuration of components illustrated in FIG. 2 is provided as one non-limiting example. Also, the position of the ECU 200 within the motorcycle 10 illustrated in FIG. 1 is provided as one example location and the actual location of the ECU 200 may vary. Also, functionality described herein as being performed via the ECU 200 may be distributed among multiple components of the motorcycle 10, such as, for example, among multiple ECUs.

As shown in FIG. 2, the ECU 200 includes a plurality of electrical and electronic components that provide power, operational control, and protection to the components and modules within the ECU 200. As illustrated in FIG. 2, in some aspects, the ECU 200 includes an electronic processing unit 204 (for example, an electronic microprocessor, microcontroller, or similar device), a memory 208 (for example, non-transitory, computer-readable memory), and an input/output (I/O) interface 212. As noted above, the ECU 200 may include additional or alternative components, including additional electronic processors and memory, or application specific integrated circuits (ASICs), as well as one or more input devices, output devices, or a combination thereof.

The components of the ECU 200 may be connected in various ways including, for example, a local bus. The electronic processing unit 204 is communicatively coupled to the memory 208 and executes instructions stored on the memory 208. For example, in some aspects, the electronic processing unit 204 is configured to retrieve from the memory 208 and execute, among other things, instructions related to the control processes and methods described herein. For example, as illustrated in FIG. 2, the memory 208 may store a daylight override module 210 including executable instructions for performing the functionality described herein. The instructions and associated functionality as described herein may be combined and distributed in various ways and, in some aspects, functionality described herein as being performed via execution of the module 210 may be distributed among fewer or additional modules. The memory 208 may also store parameters used by the module 210, such as, for example, one or more thresholds, a status (e.g., a flag or other identifier representing a state) of AHB function of the motorcycle 10, a status (e.g., a flag or other identifier representing a state) of a daylight override for the AHB function, or a combination thereof. These parameters may also be stored in other memory modules included in the motorcycle 10 that the ECU 200 has access to. In some aspects, one or more of these parameters are stored in persistent memory such that the parameters (e.g., set during previous operation of the motorcycle 10) can be retained and applied (e.g., by default) when the motorcycle 10 is subsequently operated (e.g., turned on).

The I/O interface 212 enables the ECU 200 to exchange data with other components of the motorcycle 10, external to the motorcycle 10, or a combination thereof. For example, the I/O interface 212 may include a wired or wireless connection (e.g., a wired port, wireless transceiver, or a combination thereof) for communicating with a controller area network (CAN) bus, local interconnect network (LIN) bus, or other communication bus or channel of the vehicle 10. Also, in some aspects, the I/O interface 212 includes a wired or wireless (e.g., a wired port, wireless transceiver, or a combination thereof) for communicating with an external device, such as a user's mobile phone, smart watch or other wearable, or the like, such as, for example, over a short-range wireless connection (e.g., networks using a Bluetooth communication standard or protocol, a near field communication link, or the like), a local-area network (e.g., a Wi-Fi connection), or the like. Also, in some aspects, the I/O interface 212 includes one or more dedicated connections with other components of the motorcycle 10.

As illustrated in FIG. 2, through the I/O interface 212, the ECU 200 may communicate with an input mechanism, such as, for example, the lighting input mechanism 46. The ECU 200 may also communicate with the camera 60, the light sensor 62, the wheel rotation sensor 64, or a combination thereof. In some aspects, communication with the lighting input mechanism 46, the camera 60, the light sensor 62, the wheel rotation sensor 64, or a combination thereof may occur over a CAN bus of the motorcycle 10. However, in other aspects, different forms of communication may be used, and one or more intermediary components may process data between a data source and the ECU 200. In some aspects, the ECU 200 may not communicate with all of the components illustrated in FIG. 2. For example, in some aspects, when the ECU 200 is configured to perform the override functionality described herein but a separate ECU or component is configured to perform AHB control as described herein, and, thus, the ECU 200 may not receive data from the speed sensor 64, the camera 60, or a combination thereof.

As illustrated in FIG. 2, the ECU 200 also communicates with the high beam headlight 42 (or a control unit associated with the high beam headlight 42 or an associated headlight assembly) via the I/O interface 212. For example, in some aspects, the ECU 200 outputs (through the I/O interface 212) data signals instructing a particular operating state of the high beam headlight 42, such as, for example, an on or off state of the high beam headlight 42. For example, the ECU 200 may output instructions (e.g., on the CAN bus) for whether the high beam headlight 42 should be turned on or off. Alternatively or in addition, the ECU 200 may selectively output or control the supply (through the I/O interface 212 or a different interface) of power to the high beam headlight 42, which controls whether the high beam headlight 42 is turned on or off. In other words, the ECU 200 is configured to generate an output that allows the high beam headlight 42 to be turned on, wherein the output may include a data signal or instruction, a supply of power, or a combination thereof and, thus, the ECU 200 controls operation of the high beam headlight 42. Although not illustrated in FIG. 2, in some aspects, the ECU 200 also outputs one or more data signals to control information provided via one or more user interfaces. For example, the ECU 200 may output one or more data signals to turn on one or more indicators or display various messages, icons, or other information to inform a rider of a state of the high beam headlight 42 (e.g., on or off), a state of an AHB function (e.g., enabled or disabled), a state of a daylight override for the AHB function (e.g., enabled or disabled), or a combination thereof. In some aspects, the same data signals output by the ECU 200 for controlling the high beam headlight 42 (e.g., as communicated on the CAN bus) are also used by other components in the motorcycle 10 to control the display of information on one or more user interfaces (e.g., without the need for separate data signals from the ECU 200).

FIG. 3 is a flow chart illustrating a method 300 of controlling the high beam headlight 42 of the motorcycle 10 according to some aspects. The method 300 is described herein in as being performed by the ECU 200, and, in particular, via the daylight override module 210 executed by the electronic processing unit 204 included in the ECU 200. However, as noted above, the functionality described herein can be distributed among multiple modules, devices (processing units, ECUs), or a combination thereof. For example, as noted above, portions of the method 300 may be performed via a separate ECU, such as, for example, a separate ECU providing AHB control.

As illustrated in FIG. 3, the method 300 includes receiving an input (e.g., via the lighting input mechanism 46 or other type of input mechanism) to turn on the high beam headlight 42 (at block 305). In some aspects, the input to turn on the high beam headlight 42 received at block 305 includes input requesting a static "on" state of the high beam headlight 42 as compared to a temporary "flash" of the high beam headlight 42. For example, the high beam headlight 42 may be operated in one or more operating states. One state may include a "flash" or temporary operating state and another state may include a static "on" state. Different input mechanisms may be provided for these different operating states, or the same input mechanism may be used to designate one of the operating states. For example, in some implementations, the lighting input mechanism 46 includes a lever, and the lever may be pushed or moved a predetermined amount to temporarily "flash" the high beam headlight 42, wherein in response to the user releasing the lever, the high beam headlight 42 is turned off. Alternatively, the lever may be pushed or moved to a different position representing a static "on" state of the high beam headlight 42, wherein the lever is held in that position when the user releases the lever.

As a temporary "flash" operating mode may be used to signal other vehicles (e.g., alert another driver of an intention to change lanes, a hazard, or the like), the ECU 200 may be configured to allow operation of the high beam headlight 42 (at block 315 in FIG. 3) in the "flash" mode regardless of whether an automatic high beam (ABH) function is enabled or disabled. However, in other aspects, the ECU 200 may process any type of input to turn on the high beam headlight 42 as illustrated in blocks 305-330 of FIG. 3.

As illustrated in FIG. 3, the ECU 200, after receiving the input to turn on the high beam headlight 42 (at block 305), the ECU 200 determines whether an AHB function of the motorcycle 10 is enabled (at block 310). In some aspects, the memory 208 may store a status (e.g., a flag or other identifier of a state) of the AHB function, which may be set by a user through one or more user interfaces provided by the motorcycle 10. Also, in some aspects, a mobile phone, smart watch or other wearable, key fob, or other device may provide one or more user interfaces for setting a status of the AHB function (e.g., enabled or disabled) and this setting may be communicated to the motorcycle 10 and to the ECU 200. Furthermore, in some aspects, a status of the AHB function may be stored or managed by a separate component (e.g., a separate ECU) included in the motorcycle 10.

In response to detecting that the ABH function is disabled (at block 310, following the "No-Disabled" path), the ECU 200 allows the high beam headlight 42 to be turned on (at block 315). As noted above, the ECU 200 may be configured to output one or more data signals to the high beam headlight 42 (or a controller or ECU associated with the same) instructing the high beam headlight 42 to be turned on. Various user interfaces of the motorcycle 10 may also be modified to inform a user that the high beam headlight 42 has been turned on.

In response to detecting that the ABH function is enabled (at block 310, following the "Yes-Enabled" path), the ECU 200 determines a current time of day, which the ECU 200 uses to determine whether the motorcycle 10 is being operated in the daylight (at block 320). The ECU 200 may determine the current time of day based on, for example, data received from the camera 60, the light sensor 62, or a combination thereof. For example, in response to a data signal from the light sensor 62 indicating that a detected light level satisfies (e.g., is at or above) a predetermined light threshold (e.g., 1,000 lux), the ECU 200 may set the current time of day to "daylight." Alternatively, in response to a data signal from the light sensor 62 indicating that a detected light level does not satisfy (e.g., is below) the predetermined light threshold, the ECU 200 may set the current time of day to "nighttime." In some aspects, the ECU 200 may similarly compare a light level determined based on image data collected via the camera 60 to a predetermined threshold to determine whether a current time of day is daylight or nighttime. Any thresholds used by the ECU 200 as part of determining the current time of day may be stored in the memory 208. Also, in some aspects, other components in the motorcycle 10 may track a current time of day and the ECU 200 may use such information to determine the current time of day (e.g., without requiring that the ECU 200 make any comparisons with thresholds, receive data from the light sensor 62 or the camera 60, or a combination thereof). Alternatively or in addition, the ECU 200 may use a current time maintained by a clock of the motorcycle 10 (and optionally a current date) to determine whether the motorcycle 10 is driving during daylight or nighttime.

In response to determining that the current time of day is daylight (at block 320, following the "Yes" path), the ECU 200 determines whether a daylight override for the AHB function is enabled (at block 325). Similar to the status of the AHB function, the status of the daylight override (e.g., a flag or other identifier of a state) may be stored in the memory 208 and may be set by a user through one or more user interfaces provided by the motorcycle 10. Also, in some aspects, a mobile phone, smart watch or other wearable, key fob, or other device may provide one or more user interfaces for setting a status of the daylight override (e.g., enabled or disabled) and this setting may be communicated to the motorcycle 10 and to the ECU 200. Furthermore, in some aspects, a status of the daylight override may be stored or managed by a separate component (e.g., ECU) included in the motorcycle 10.

In response to the daylight override being enabled (at block 325, following path "Yes-Enabled") and the current time of day being daylight (at block 320, following the "Yes" path), the ECU 200 allows the high beam headlight 42 to be turned on (at block 315). As noted above, the ECU 200 may be configured to output one or more data signals to the high beam headlight 42 (or a controller or ECU associated with the same) instructing the high beam headlight 42 to be turned on. Various user interfaces of the motorcycle 10 may also be modified to inform a user that the high beam headlight 42 has been turned on. For example, an indicator associated with the high beam headlight 42 may be turned on and, in some aspects, an indicator associated with the daylight override, the AHB function, or both may be modified. In some aspects, to avoid confusion for the user, an indicator for the AHB function may be turned off when the daylight override is being implemented (and automatically turned back on when the override is no longer being implemented). In some aspects, this modification, however, may be solely for informational purposes as the AHB function is not actually disabled in this situation.

In particular, turning the high beam headlight 42 on in this situation may not impact the current status of the AHB function. In other words, the high beam headlight 42 is enabled in this situation while maintaining the AHB function in an enabled state (i.e., without disabling the AHB function). Accordingly, the high beam headlight 42 may be turned on in this situation and may remain on until additional input is received to turn off the high beam headlight 42 or until the motorcycle 10 is no longer driving during daylight (as implemented via the AHB function). In response to detecting that the motorcycle 10 is no longer driving during daylight, the daylight override is no longer applicable, and AHB control is applied (as the AHB function was not disabled and remains enabled). Thus, the daylight override allows the high beam headlight 42 of the motorcycle 10 to be selectively turned on during daylight driving conditions while maintaining AHB function enabled, which allows AHB control to be applied when the daylight driving condition is no longer detected. In other words, the daylight override blocks automatic control of the high beam headlight via the AHB function while the current time of day is daylight without disabling the AHB function. In particular, while the high beam headlight 42 is turned on, the method 300 may be repeated (e.g., starting at block 310) to continue to check for changing driving conditions and control the high beam headlight 42 accordingly.

As illustrated in FIG. 3, in response to the daylight override being disabled (at block 325, following the "No-Disabled" path) and the current time of day being daylight (at block 320, following the "Yes" path), the ECU 200 implements the AHB function and prevents the high beam headlight 42 from being turned on (i.e., the high beam headlight 42 remains off) in response to the received input (at block 330). In some aspects, various user interfaces of the motorcycle 10 may also be modified to inform a user that the high beam headlight 42 has not been turned on. For example, an indicator may be provided on a user interface informing the user that the AHB feature is enabled or active. In some aspects, this indicator may be flashed or other temporarily modified to inform the user that user's input to turn on the high beam headlight 42 was overridden due to the active state of the AHB function.

Similarly, as illustrated in FIG. 3, in response to the current time of day not being daylight (at block 320, following the "No" path), the ECU 200 continues to implement the AHB function and checks for other driving conditions that may prevent the high beam headlight 42 from being turned on. While the different conditions checked as part of the AHB function may vary, FIG. 3 provides one example set of such conditions, which may include determining whether the motorcycle 10 is being driven in the city or another populated area (at block 335), determining whether traffic (e.g., oncoming traffic detected via headlights and/or preceding traffic detected via taillights) has been detected (at block 340), determining whether the motorcycle 10 is being driven less than a predetermined speed threshold (at block 345), and determining whether the motorcycle 10 is being driven in fog (at block 350). As noted above, these driving conditions can be detected using various data from vehicle sensors communicating with the ECU 200, external devices or systems communicating the ECU 200, or a combination thereof. In response to any one of these conditions being detected, the ECU 200 implements the AHB function and prevents the high beam headlight 42 from being turned on in response to the received input (at block 330). As noted above, in some aspects, various user interfaces of the motorcycle 10 may be modified to inform a user that the high beam headlight 42 has not been turned on. The thresholds, rules, or logic applied as part of the AHB function may be set differently for different jurisdictions and/or types of vehicles or terrain and may, in some aspects, depend on applicable regulations, such as for example, Regulation No 48 of the Economic Commission for Europe of the United Nations (UNECE).

As illustrated in FIG. 3, in response to none of the conditions being detected, the ECU 200 turns on the high beam headlight 42 in response to the received input (at block 315). Again, as noted above, various user interfaces of the motorcycle 10 may also be modified to inform a user that the high beam headlight 42 has been turned on.

In some aspects, one or more additional checks may optionally be included as part of the method 300. For example, as illustrated in FIG. 4, in some aspects, the method 300 also optionally includes determining market configuration of the motorcycle 10 and determining whether the market configuration allows for implementation of the daylight override (at block 360) before implementing the daylight override. For example, in some jurisdictions, such as, for example, different geographical jurisdictions, a particular override of the AHB function may not be allowed. Accordingly, in these scenarios, the method 300 may be configured to check the market configuration of the motorcycle 10, which may be stored in the memory 208 or another memory module of the motorcycle 10 and set at time of manufacturer or distribution or dynamically set, such as based on a current geographical location of the motorcycle, and compare the market configuration of the motorcycle 10 to a list of market configurations where the override is allowed or, alternatively, a list of market configurations where the override is not allowed (again, as stored in the memory 208 or otherwise accessed by the ECU 200). As illustrated in FIG. 4, in response to the market configuration of the motorcycle 10 being a market configuration that allows the daylight override (at block 360, following the "Allowed" path), the ECU 200 allows the high beam headlight 42 to be turned on as described above (at block 315). Alternatively, in response to the market configuration of the motorcycle 10 not being a market configuration that allows the daylight override (at block 360, following the "Not Allowed" path), the ECU 200 implements the AHB function and prevents the high beam headlight 42 from being turned on in response to the received input as described above (at block 330).

Accordingly, aspects described herein provide methods and systems for providing a daylight override for an AHB function that allows a high beam headlight to be turned on during a daylight driving condition even when the AHB function is enabled and without disabling the AHB function that may otherwise impact future operation of the high beam headlight (e.g., identification and automatic control the high beam headlight in other driving conditions).

Various features and advantages of some aspects are set forth in the following claims.

What is claimed is:

1. A system comprising:
a high beam headlight mounted on a vehicle;
a sensor mounted on the vehicle; and
an electronic control unit configured to:
receive an input to turn on the high beam headlight,
determine a status of an automatic high beam function of the vehicle,
determine a status of an override of the automatic high beam function of the vehicle,
determine a current time of day based on data received from the sensor, and
in response to the status of the automatic high beam function being enabled, the current time of day being daylight, and the status of the override being enabled, override the automatic high beam function to allow the high beam headlight to be turned on based on the input while maintaining the status of the automatic high beam function as enabled.

2. The system of claim 1, wherein the electronic control unit is further configured to, in response to the current time of day being daylight and the status of the override being disabled, prevent the high beam headlight from being turned on based on the input in accordance with the automatic high beam function.

3. The system of claim 1, wherein the sensor includes at least one of a camera and a light sensor.

4. The system of claim 1, wherein the electronic control unit is further configured to receive a second input and set the status of the override based on the second input.

5. The system of claim 4, further comprising a user interface mounted on the vehicle, wherein the electronic control unit is configured to receive the second input from the user interface.

6. The system of claim 1, wherein the electronic control unit is further configured to determine a market configuration of the vehicle and wherein the electronic control unit is configured to override the automatic high beam function to allow the high beam headlight to be turned on based on the input while maintaining the status of the automatic high beam function as enabled in response to the current time of day being daylight, the status of the override being enabled, and the override being allowed in the market configuration.

7. A method for controlling a high beam headlight of a vehicle, the method comprising:
receiving, at an electronic control unit of the vehicle, an input to turn on the high beam headlight;
determining, at the electronic control unit of the vehicle, a status of an automatic high beam function of the vehicle,
determining, at the electronic control unit, a status of an override of the automatic high beam function of the vehicle;
determining, at the electronic control unit, a current time of day; and
in response to the status of the automatic high beam function being enabled, the current time of day being daylight, and the status of the override being enabled, overriding, at the electronic control unit, the automatic high beam function to allow the high beam headlight to be turned on based on the input while maintaining the status of the automatic high beam function as enabled.

8. The method of claim 7, further comprising, in response to the current time of day being nighttime, allowing the high beam headlight to be turned on based on the input.

9. The method of claim 7, further comprising, in response to the current time of day being daylight and the status of the override being disabled, preventing the high beam headlight from being turned on based on the input in accordance with the automatic high beam function.

10. The method of claim 7, further comprising, in response to the status of the automatic high beam function being disabled, allowing the high beam headlight to be turned on based on the input.

11. The method of claim 7, wherein determining the current time of day includes determining the current time of day based on data received from at least one of a camera mounted on the vehicle and a light sensor mounted on the vehicle.

12. The method of claim 7, further comprising receiving a second input and setting the status of the override based on the second input.

13. The method of claim 12, wherein receiving the second input includes receiving the second input through a user interface of the vehicle.

14. The method of claim 7, further comprising, determining a market configuration of the vehicle and wherein overriding the automatic high beam function to allow the high beam headlight to be turned on based on the input while maintaining the status of the automatic high beam function as enabled includes overriding the automatic high beam function in response to the current time of day being daylight, the status of the override being enabled, and the override being allowed in the market configuration.

15. Non-transitory computer-readable medium storing instructions that, when executed by one or more electronic processors, perform a set of functions, the set of functions comprising:
   receiving an input to turn on a high beam headlight of a vehicle;
   determining a status of an automatic high beam function of the vehicle,
   determining a status of an override of the automatic high beam function of the vehicle;
   determining a current time of day; and
   in response to the status of the automatic high beam function being enabled, the current time of day being daylight, and the status of the override being enabled, overriding the automatic high beam function to allow the high beam headlight to be turned on based on the input while maintaining the status of the automatic high beam function as enabled.

16. The non-transitory computer-readable medium of claim 15, the set of functions further comprising, in response to the current time of day being daylight and the status of the override being disabled, preventing the high beam headlight from being turned on based on the input in accordance with the automatic high beam function.

17. The non-transitory computer-readable medium of claim 15, the set of functions further comprising receiving a second input and setting the status of the override based on the second input.

18. The non-transitory computer-readable medium of claim 17, wherein receiving the second input includes receiving the second input through a user interface mounted on the vehicle.

19. The non-transitory computer-readable medium of claim 15, the set of functions further comprising determining a market configuration of the vehicle and wherein overriding the automatic high beam function to allow the high beam headlight to be turned on based on the input while maintaining the status of the automatic high beam function as enabled is performed in response to the current time of day being daylight, the status of the override being enabled, and the override being allowed in the market configuration.

20. The non-transitory computer-readable medium of claim 15, the set of functions further comprising, with the high beam headlight turned on in response to the status of the override being enabled, blocking automatic control of the high beam headlight via the automatic high beam function while the current time of day is daylight.

\* \* \* \* \*